United States Patent [19]

Watanabe et al.

[11] Patent Number: 4,624,875

[45] Date of Patent: Nov. 25, 1986

[54] PROTECTED CARD

[75] Inventors: Mitsuo Watanabe, Tokyo; Takao Asaba, Kanagawa, both of Japan

[73] Assignee: Kojima, Ltd., Tokyo, Japan

[21] Appl. No.: 624,009

[22] Filed: Jun. 25, 1984

[51] Int. Cl.[4] .......................... E04F 15/16; B32B 3/02; B32B 7/06; B32B 31/00

[52] U.S. Cl. .......................................... 428/41; 428/14; 428/194; 428/202; 428/204; 40/10 R; 156/249

[58] Field of Search .................. 428/41, 200, 201, 202, 428/203, 205, 46, 192, 81, 194, 204; 40/10 R; 156/249, 189

[56] References Cited

U.S. PATENT DOCUMENTS

| | | | |
|---|---|---|---|
| 3,868,293 | 2/1975 | Selph | 428/40 |
| 3,950,580 | 4/1976 | Boudet | 428/41 |
| 3,983,277 | 9/1976 | Ackerman et al. | 428/46 |
| 4,223,058 | 9/1980 | Citron | 428/192 |
| 4,225,369 | 9/1980 | Felchlin | 428/203 |
| 4,231,833 | 11/1980 | Lieberman | 428/41 |
| 4,343,851 | 8/1982 | Sheptak | 428/203 |
| 4,400,419 | 8/1983 | Laczynski | 428/203 |

*Primary Examiner*—Edward Kimlin
*Assistant Examiner*—Louis Falasco
*Attorney, Agent, or Firm*—Wolf, Greenfield & Sacks

[57] ABSTRACT

A card assembly comprising a backing sheet, a first transparent film bonded to the backing sheet along one side margin area portion through a first pressure sensitive adhesive coating, a transparent releasable film attached to the first transparent film along the remaining area portion, a cut line of a generally closed-loop configuration formed through the first transparent film and the releasable film to define a configuration corresponding to the circumference of a thin article to be interposed between the releasable sheet and the backing sheet, the configuration defining margin area portion on the releasable sheet being along the entire circumference thereof, and a second transparent film secured to the outer surface of the first transparent film along the entire surface thereof through an adhesive coating.

1 Claim, 14 Drawing Figures

PRIOR ART

PROTECTED CARD

BACKGROUND OF THE INVENTION

This invention relates to a card assembly such as a post card or a label of the kind including a backing sheet and a transparent film attached on the backing sheet through a pressure sensitive adhesive coating, for interposing therebetween a thin article such as a photograph, a label or the like having indicia thereon whereby the surfaces of the article are protected from alteration.

Various proposals have been made with respect to card assemblies of the aforementioned kind. FIGS. 7 and 8 show one typical prior art device wherein one surface of a transparent cover film 1 is coated by a pressure sensitive adhesive 2 and one side area portion (the left side in the drawings) is attached to the corresponding side margin area portion of a backing sheet 4 by the pressure sensitive adhesive 2. The remaining area portion of the pressure sensitive adhesive 2 is normally covered by a releasable sheet 3. In use, a thin article 5 such as a photograph or the like is mounted on the backing sheet 4, and the cover film 1 is pressed on the article 5 and the backing sheet 5 with the releasable sheet being removed, whereby the article 5 is firmly retained between the cover film 1 and the backing sheet 4 and the article 5 is reliably protected by the cover film 1. However, there is a problem in that it is difficult to apply the cover film 1 having adhesive coating thereon uniformly on the photograph 5 and the backing sheet 4 without generating any air bubbles or wrinkles or creases.

SUMMARY OF THE INVENTION

The present invention aims to solve the problem aforementioned so that even an unskilled person can easily handle a card assembly, such as a post card, when striking thereon a photograph or the like finely.

The card assembly according to the invention comprises a first transparent cover film having a pressure sensitive adhesive coating on one surface thereof, a transparent releasable film stuck to one surface of the first film apart from one side margin area portion, a backing sheet stuck to the first cover film along said one side margin area portion through the pressure sensitive adhesive coating, a cut line of a closed-loop configuration extending through the first cover film and the releasable film and corresponding to the configuration of a thin article to be mounted on the backing sheet, and a second transparent cover film stuck on the other surface of the first transparent film by an adhesive coating.

Another object of the present invention is to provide a method for producing the card assembly.

BRIEF DESCRIPTION OF THE DRAWINGS

Further objects and advantages of the invention will become apparent from the following description taken in connection with accompanying drawings, in which.

DETAILED DESCRIPTION OF THE PREFERRED EMBODIMENTS

Figure 1:
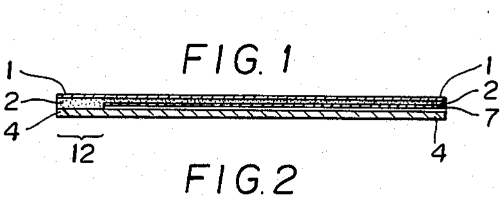
FIG. 1 is a sectional view showing a first step of producing a card assembly according to the invetnion.

Firstly, as shown in FIG. 1, a transparent cover film 1 (which is referred to as a first film according to the invention) is coated by a transparent pressure sensitive adhesive 2, and a transparent releasable film 7 is laminated and attached to the first cover film 1 through the adhesive 2 excluding one side margin area portion 12 of the first cover film 1. Then, the first cover film 1 is pasted to a backing sheet 4, the configuration of which is equal to that of the first film 1, through the adhesive 2 which is exposed at the side margin area portion 12. The side margin area portion 12 defines a hinge line 13 which is clearly shown in FIG. 3.

Figure 3:
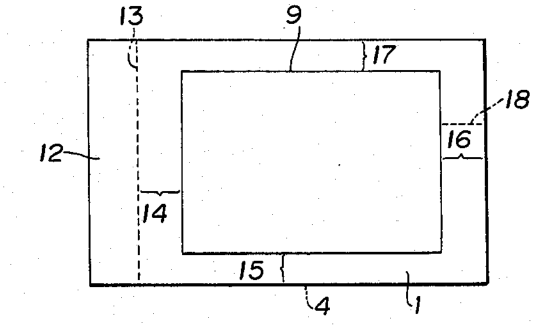
FIG. 3 is a plan view of FIG. 2.

Secondly, a cutter 8 having a desired closed-loop configuration 9 as shown in FIG. 3 is used to cut the first film 1 and the releasable film 7. The configuration of the cut line 9 preferably corresponds to the configuration of a thin article 5 which it is intended to mount between the backing sheet 4 and the transparent films 1 and 7 in utilizing the card assembly. Further, the cut line 9 defines margin area portions around the circumference thereof as shown in FIG. 3. Preferably, an additional cut line 18 is formed in performing the second step so that the margin area portions 14, 15, 16 and 17 of the releasable film 7 can easily be removed in utilizing the card assembly.

Figure 4:
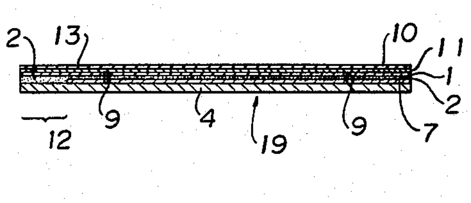
FIG. 4 is a sectional view showing the card assembly according to the invention.

Thirdly, a second transparent cover film 10 is pasted on the first film 1 along the entire surface thereof and by means of a suitable adhesion 11. Thus, the card assembly according to the invention is finally formed as shown in FIG. 4. A laminated assembly of the second film 10. Adhesive coating 11, the first film 1, the pressure sensitive adhesive 2 and the releasable film 7 is secured to the backing sheet 4 along the margin area portion 12 and is hinged thereto around the hinge line 13.

Figure 5:
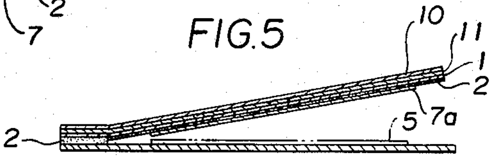
FIG. 5 is a sectional view showing a process for utilizing the card assembly of FIG. 4.
Figure 6:
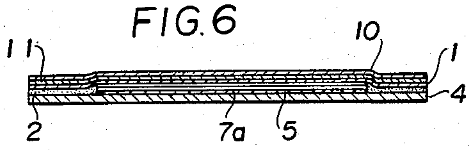
FIG. 6 is a sectional view showing the card assembly according to the invention with a thin article being protectingly retained therein.
Figure 7:
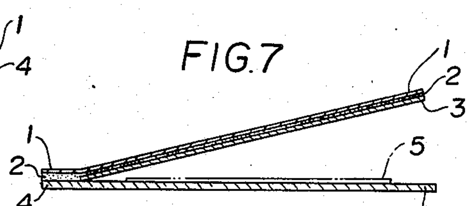
FIG. 7 is a sectional view showing a prior art card assembly.
Figure 8:
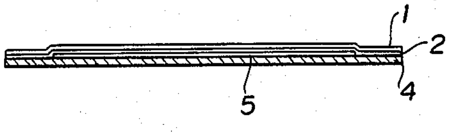
PRIOR ART FIG. 8
FIG. 8 is a sectional view showing the prior art card assembly having a thin article mounted therein.

In use, the laminated assembly 11, 1 and 7 are hingedly opened from the backing sheet 4, and a thin article 5 such as a photograph or the like is located on the backing sheet 4 as shown in FIG. 5. Then, the margin area portion 14, 15, 16 and 17 of the releasable sheet 7 is removed from the laminated assembly so as to expose the pressure sensitive adhesive 2. Preferably, the location of the cut line 9 is marked on the backing sheet 4 by printing process or the like so that the article 5 can easily be located on the backing sheet 4. The laminated assembly is replaced with portions 14, 15, 16 and 17 of removable film 7 being removed on the backing sheet 4 and is secured to the backing sheet 4 by means of the pressure sensitive adhesive 2, as shown in FIG. 6. The film 1 is firmly secured to the backing sheet 4 at the margin area portion 14, 15, 16 and 17. The surface of the article 5 is not secured to the film 1 due to the releasable film 7 interposed therebetween. Thus the problem of air bubbles or the like in the prior art device can reliably be prevented.

According to the invention, the following advantages can be obtained.

(a) The first cover film is not bonded to or is bonded to only a small peripheral portion of the article and, it is thereby possible to prevent generation of wrinkles in the cover films 1 and 10 or of air bubbles between the article and the film 1.

(b) Accordingly, the card assembly can easily and satisfactorily be utilized by unskilled persons.

(c) The surface of the article, such as a photograph, is covered by three laminate transparent films 7, 1 and 10, and thus it is possible to reliably prevent damage or destruction of the photograph or similar article.

(d) The thickness of the three laminate films 7, 1 and 10 is practically very thin such as 75–80 μm; thus, the weight of the card assembly can be reduced, and satisfactorily transparent characteristics of the laminate film can be obtained.

(e) It is possible to remove the releasable film entirely whereby one or more small sized articles can easily be mounted at desired locations.

Practically, the production steps described heretofore with reference to FIG. 1 are performed by utilizing standard sized backing sheets such as paper sheets of standard size, e.g. AO (841 mm×1189 mm) or BO (1030 mm×1456 mm). Such production process will hereinafter be explained with reference to FIGS. 9–14.

Figure 10:
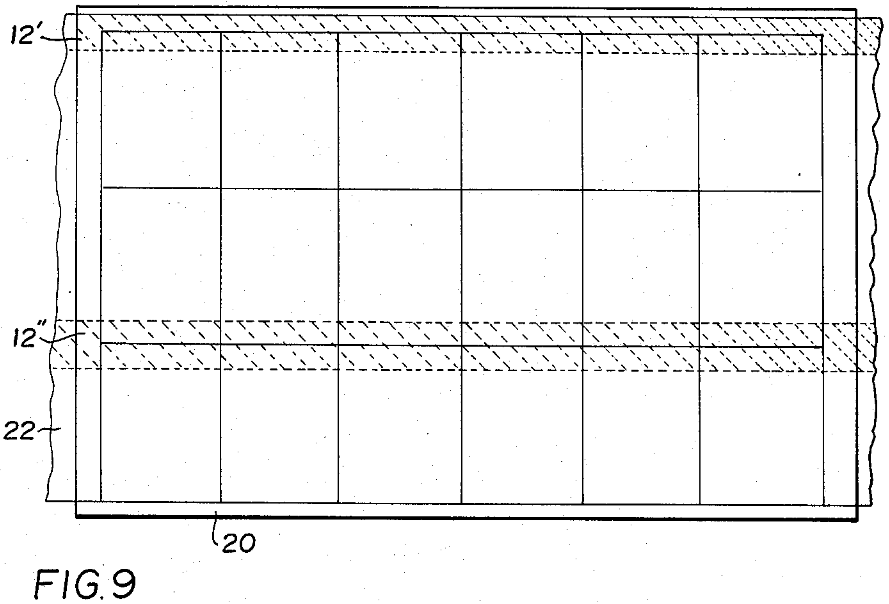
FIG. 10 is a plan view of the large sized sheet of FIG. 9.
Figure 9:
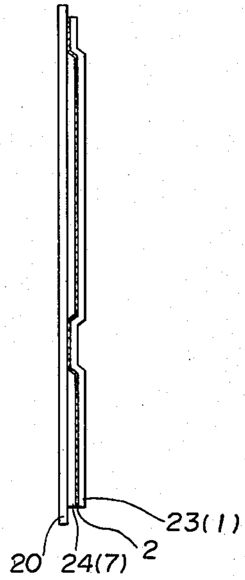
FIG. 9 is a sectional view corresponding to FIG. 1 but showing a large sized sheet of the backing sheet for producing a plurality of card assemblies according to the invention.
Figure 11:
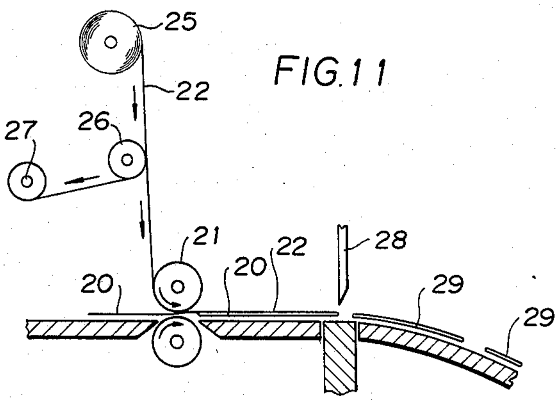
FIG. 11 is a schematic view of a mechanism for performing the production step of FIG. 1.

Such standard sized sheets 20, having thereon desired insignic or markings which have been applied thereon by a printing process, are supplied one by one into the pressing rolls 21. A laminated film 22 consisting of a transparent cover film 23 (which corresponds to the first cover film 1) and a removable transparent film 24 (which is laminated to the cover film 23 through pressure sensitive adhesive 2) is stored as a roll 25 and is supplied therefrom. Portions 12′ and 12″ of the removal film 24 are removed from the stripping roll 26 and are wound around a shaft 27. The laminated film 22 is affixed to the sheet 20 at locations 12′ and 12″ as shown in FIG. 10. The sheet 20 passed through the pressing rolls 21 is connected through the film 22 to the following sheet 20 and thus a cutter 28 is provided to form respective laminate sheets 29 (FIG. 11). In FIG. 10, it is illustrated that eighteen card assemblies 4 are intended to be formed on a single standard sized sheet 20, and thus the film 22 is affixed to the sheet 20 at locations 12′ and 12″, but the number and the arrangement of such affixing locations may be determined as desired.

Figure 2:
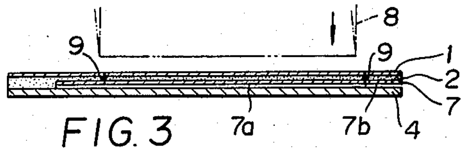
FIG. 2 is a sectional view showing a second step of producing the card assembly according to the invention.
Figure 12:
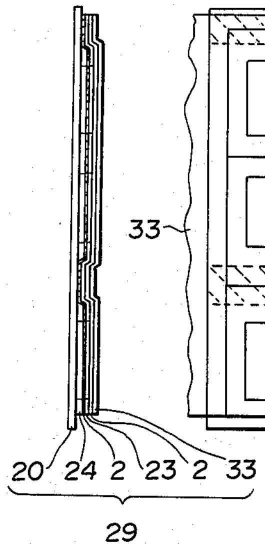
FIG. 12 is a sectional view showing a plurality of card assemblies according to the invention formed on the large sized backing sheet.
Figure 13:
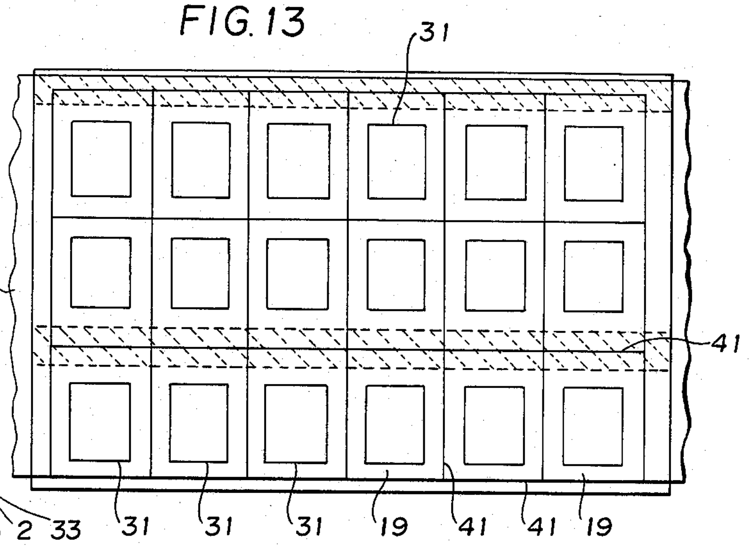
FIG. 13 is a plan view of FIG. 12.
Figure 14:
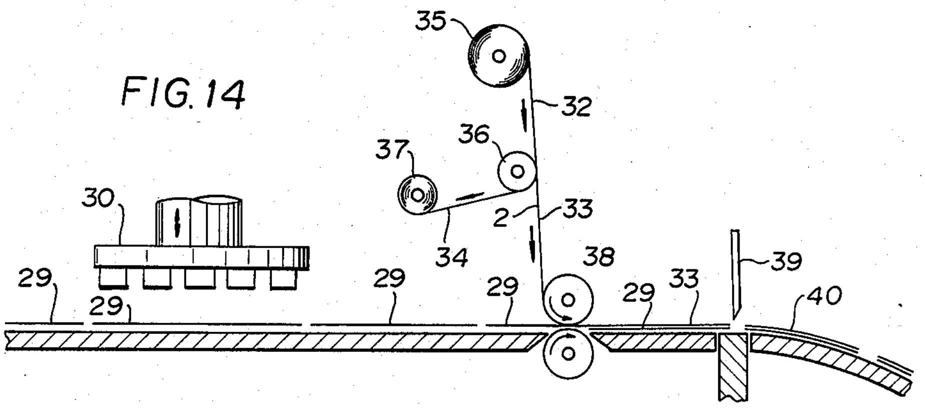
FIG. 14 is a schematic view of a mechanism for performing the production steps of FIGS. 2 and 4.

If desired, a printing process is applied on laminate sheets 29 and, thereafter, sheets 29 are processed to the next step shown in FIGS. 12–14. A cutter 30 is utilized to form cutlines 31 (FIG. 13) through the first film 22 and the removable film 24 as described heretofore with reference to FIGS. 2 and 3. A long laminate film 32 consisting, similarly to the laminate film 22, of a second transparent cover film 33 and a removable film 34 (affixed to the film 33 through adhesive 2) is stored as a roll 35 and is supplied therefrom. The removable film 34 is separated at a stripping roll 36 and is wound around a shaft 37. The second film 33 is affixed to the laminate sheet 29 at pressing rolls 38. A cutter 39 separates respective laminated sheets 40. As desired, a printing process is applied on the sheets 40 and, thereafter, a cutting process is applied along cut lines 41 as shown in FIG. 13 to form respective card assemblies 19 according to the invention.

According to the invention, the printing process can be performed by a lithographic printing process and thus the printing is accurate and fine and multi-colored printing can be performed finely. Further, the production process is very efficient and production costs can be substantially reduced.

What is claimed is:

1. A card assembly comprising a backing sheet, a first transparent film having an inner surface bonded to the backing sheet along one side margin area portion through a first pressure sensitive adhesive coating, a transparent releasable film adhesively bonded by a second pressure sensitive adhesive to an inner surface of the first transparent film along the remaining area portion, a cut line of a generally closed-loop configuration formed through the first transparent film and the releasable film to define a configuration corresponding to the circumference of a thin article to be interposed between the releasable sheet and the backing sheet, said configuration defining a margin area portion on the releasable sheet being along the entire circumference of the releasable sheet such that marginal areas thereof are removably attached to the first transparent film to expose the second pressure sensitive adhesive coating on said first transparent film and a second transparent film secured to the outer surface of the first transparent film along the entire surface thereof by means of an adhesive coating.

* * * * *